(12) United States Patent
Jader

(10) Patent No.: US 10,821,045 B2
(45) Date of Patent: Nov. 3, 2020

(54) BEAM-MOUNTED SUPPLY UNIT FOR FASTENING MEDICAL DEVICES TO A CEILING

(71) Applicant: DRÄGERWERK AG & CO. KGAA, Lübeck (DE)

(72) Inventor: Dhafir Jader, Ratzeburg (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 49 days.

(21) Appl. No.: 16/099,838

(22) PCT Filed: Apr. 26, 2017

(86) PCT No.: PCT/EP2017/000520
§ 371 (c)(1),
(2) Date: Nov. 8, 2018

(87) PCT Pub. No.: WO2017/194182
PCT Pub. Date: Nov. 16, 2017

(65) Prior Publication Data
US 2019/0110941 A1    Apr. 18, 2019

(30) Foreign Application Priority Data
May 13, 2016   (DE) .................. 10 2016 005 786

(51) Int. Cl.
| | |
|---|---|
| A61G 12/00 | (2006.01) |
| F16M 13/02 | (2006.01) |
| F16M 11/42 | (2006.01) |
| F16D 63/00 | (2006.01) |
| F16D 121/26 | (2012.01) |
| F16D 121/22 | (2012.01) |
| F16D 125/64 | (2012.01) |

(52) U.S. Cl.
CPC ......... A61G 12/004 (2013.01); F16D 63/008 (2013.01); F16M 11/425 (2013.01);
(Continued)

(58) Field of Classification Search
CPC .... A61G 12/004; A61G 12/00; A61G 12/001; A61G 12/002; F16D 3/008;
(Continued)

(56) References Cited

U.S. PATENT DOCUMENTS

| | | |
|---|---|---|
| 3,548,122 A | 12/1970 | Hay |
| 4,221,281 A | 9/1980 | Melson |

(Continued)

FOREIGN PATENT DOCUMENTS

| | | |
|---|---|---|
| CN | 201902447 U | 7/2011 |
| CN | 201902484 U | 7/2011 |

(Continued)

*Primary Examiner* — Nkeisha Smith
(74) *Attorney, Agent, or Firm* — McGlew and Tuttle, P.C.

(57) ABSTRACT

A trolley (1), for a beam-mounted supply unit, for fastening medical devices to a ceiling. The trolley has a chassis (2) which can be meshed with a rail track of the beam-mounted supply unit for moving the trolley (1) along the rail track. A medical device can be fastened to the trolley (1). The trolley has a brake unit (3) with at least one braking element (7), which exerts a braking force on the rail track and/or on the chassis in the activated state of the brake unit (3), so that a movement of the chassis along the rail track is at least made difficult compared to an operating state with the brake unit (3) deactivated. In the activated state of the brake unit (3), the braking force exerted by the braking element (7) on the rail track and/or on the chassis is generated without the aid of electric energy.

8 Claims, 2 Drawing Sheets

(52) U.S. Cl.
CPC ....... *F16M 13/027* (2013.01); *F16D 2121/22* (2013.01); *F16D 2121/26* (2013.01); *F16D 2125/64* (2013.01); *F16M 2200/027* (2013.01)

(58) Field of Classification Search
CPC ............. F16D 2121/22; F16D 2121/26; F16D 2125/64; F16M 11/425; F16M 13/027; F16M 2200/027
USPC ........................................ 248/658, 657, 646
See application file for complete search history.

(56) References Cited

U.S. PATENT DOCUMENTS

| | | | | |
|---|---|---|---|---|
| 7,770,247 | B2* | 8/2010 | Lubbers | ................ F16D 63/008 |
| | | | | 5/600 |
| 7,966,940 | B2* | 6/2011 | Cylvick | ................ A63G 21/22 |
| | | | | 104/113 |
| 2007/0007418 | A1* | 1/2007 | Lubbers | ................ F16D 63/008 |
| | | | | 248/326 |
| 2008/0116351 | A1* | 5/2008 | Dave | .................... A61B 6/4464 |
| | | | | 248/646 |

FOREIGN PATENT DOCUMENTS

| | | |
|---|---|---|
| CN | 202302587 U | 7/2012 |
| CN | 203322103 U | 12/2013 |
| DE | 35 33 229 A1 | 3/1987 |
| DE | 299 20 098 U1 | 2/2000 |
| DE | 100 56 589 A1 | 5/2002 |
| DE | 102 18 555 A1 | 5/2003 |
| DE | 203 00 099 U1 | 5/2003 |

* cited by examiner

BEAM-MOUNTED SUPPLY UNIT FOR FASTENING MEDICAL DEVICES TO A CEILING

CROSS REFERENCE TO RELATED APPLICATIONS

This application is a United States National Phase Application of International Application PCT/EP2017/000520, filed Apr. 26, 2017, and claims the benefit of priority under 35 U.S.C. § 119 of German Application 10 2016 005 786.6, filed May 13, 2016, the entire contents of which are incorporated herein by reference.

TECHNICAL FIELD

The present invention pertains to a beam-mounted supply unit for fastening medical devices to a ceiling, which supply unit has a rail track and a trolley or a carriage or shuttle, to which at least one medical device can be directly or indirectly fastened. The trolley has a chassis that can be meshed with the rail track for moving the trolley and can be moved along the rail track. Further, a brake unit with at least one braking element is provided, which braking element exerts a braking force on the rail track and/or on the chassis in the activated state of the brake unit, so that a movement of the chassis along the rail track is at least made difficult compared to an operating state with the brake unit deactivated.

BACKGROUND

Various solutions for fastening medical devices to the ceiling of a treatment room or operating room are known from the state of the art. The prior-art fastening units are, above all, characterized in that they make possible a supply of the medical devices with operating media, electric energy and data, on the one hand, and that they ensure a flexible and at the same time secure positioning of the medical devices at the respective location needed, on the other hand. In this connection, ceiling-mounted supply units are known, which are fastened to a location of the ceiling and have various support arms or support components extending out from here. On the other hand, so-called beam-mounted supply units are known, in which a so-called supply beam is fastened to the ceiling, which in turn has a guide path, along which a trolley or a carriage can be moved, which is provided for the fastening of receptacles and/or medical devices.

From DE 35 33 229 A1 is known a beam-mounted supply unit for a medical nursing ward, which has a supply beam fixed to a ceiling in a suspended manner. The supply beam has connection elements for electrical lines and/or fluid lines and has, in addition, a longitudinal guide path, on which at least one trolley or carriage or shuttle can be moved. A support device for medical devices is attached to the trolley in a manner pivotable about a vertical axis. A clear arrangement of lines is possible by means of the supply unit described, and it is possible to align the support device with the hospital bed in the correspondingly needed manner and to fix same by means of a suitable fixing device.

An especially perfected beam-mounted supply unit for the ceiling of a treatment room is known from DE 102 18 555 A1. The beam-mounted supply unit described is characterized by two guide paths suspended from the ceiling, which guide paths are arranged at right angles to one another. The two guide paths arranged at right angles to one another are connected to one another via a rib segment, so that it is possible to move a trolley moved on the one guide path via the rib segment onto the guide path rotated by 90°.

For the supply units known from the state of the art with at least one beam fastened to the ceiling, which beam has a guide path, it is essential that the trolley, which can be moved along the guide path, makes possible a passing through of operating media, such as, for example, compressed air or gases, electric energy and/or data lines as well as communication lines. The corresponding media or lines are passed on via the trolley to the support component and/or to medical devices fastened to the trolley. In order to be able to guarantee the patient's safety at any time, the trolley has a brake, so that this trolley with the devices fastened to it can be fixed to the needed location, on the one hand, and unintentional movements are reliably prevented, on the other hand. The prior-art trolleys, which are moved along rail tracks of the ceiling-mounted supply units, usually have a pneumatic brake, which ensures the desired stopping. The problems in this case are that the generation and distribution of compressed air are comparatively expensive and that compressed air is not available in many hospitals in the world, and especially in underdeveloped countries.

SUMMARY OF THE INVENTION

On the basis of the beam-mounted supply units known from the state of the art for fastening medical devices to the ceiling and the problems described above, the basic object of the present invention is to provide a trolley for a beam-mounted supply unit, which makes possible a secure and reliable fixing of the trolley with the support components and/or medical devices fastened to it at the desired location, on the one hand, and in which, on the other hand, a comparatively simple triggering of the brake can be achieved. Furthermore, it shall be ensured that the device being described guarantees a reliable fixing of the trolley with the support components and/or medical devices fastened to it even in case of a failure of the supply of media and/or a power failure. In any case, a deactivation or a triggering of the brake unit shall be possible with simple means and be comparatively easy for the operating staff. The technical solution to be indicated shall, in addition, be integrated into the prior-art technical solutions for beam-mounted supply units with the aid of simple structural components, wherein standard structural components shall preferably be used.

The present invention pertains to a trolley, which is also sometimes called shuttle, for a beam-mounted supply unit for fastening medical devices to a ceiling. The trolley, to which at least one medical device is fastened directly or indirectly, has a chassis, which can be meshed with a rail track of the beam-mounted supply unit for moving the trolley and can be moved along the rail track. Further, a brake unit with at least one braking element is provided, which in the activated state of the brake unit exerts a braking force on the rail track and/or on the chassis, so that a movement of the chassis along the rail track is at least made difficult compared to an operating state with the brake unit deactivated. The trolley for a beam-mounted supply unit configured according to the present invention is characterized in that in the activated state of the brake unit, the braking force exerted by the braking element on the rail track and/or on the chassis is generated without the aid of electric energy and that the brake unit is deactivated and the braking element is triggered by an opposing force acting on the braking force exerted on the rail track and/or on the chassis being generated by means of an electromagnetically and/or mechanically driven actuator. The present invention is thus characterized in that the trolley of the beam-mounted supply unit is braked in the currentless state of the unit and cannot carry out any movement in relation to the rail track. This means that the brake unit is always activated when the trolley or the beam-mounted supply unit is not supplied with electric energy. The braking force is preferably achieved by means of a spring force or a magnetic force in this operating state. It is essential here that no auxiliary energy, and especially no electric energy or compressed air be needed for applying a braking force in the activated operating state of the brake unit. In this connection, the present invention is especially characterized in that triggering of the brake or deactivation of the brake unit is brought about by an opposing force being exerted on the braking element of the brake unit by means of an electromagnetically or mechanically activatable actuator, so that the braking force exerted by the braking element on the chassis of the trolley or on the rail track is reduced, preferably entirely abolished or reduced to zero. In this case, the actuator is activated by means of an electromagnetic force or mechanical force and an adjusting element, for example, an adjusting bolt, is moved such that a force for deactivation is transmitted to the braking element of the brake unit.

According to a first special embodiment of the present invention, provisions are made for the braking force exerted by the braking element on the rail track and/or on the chassis to be generated by means of an element, which exerts a spring force and/or a magnetic force, in the activated state of the brake unit. As was already described above, it is important here that the braking force in the activated state of the brake unit be brought about by a braking element, which does not need any electric energy or other auxiliary energy for its actuation.

As soon as the brake unit shall be deactivated, for example, in order to move the trolley, along with the support components and/or medical devices fastened to it, to a different location, the braking element of the brake unit is moved by the actuator such that the braking force exerted on the chassis of the trolley or on the rail track is at least reduced. The actuator is preferably connected to the braking element via at least one lever element, so that the force initiated by the actuator, no matter whether it is a braking force or a force for triggering or for deactivating the brake, is introduced into the braking element via the lever.

According to a special variant, provisions are made for the actuator to have at least one electrically actuatable pulling magnet or pushing magnet. If the brake unit shall be deactivated, the actuator is provided with electric energy in a suitable manner, so that the pulling magnet or pushing magnet preferably used is preferably moved together with the adjusting element fastened to it through a generated electromagnetic field and the braking element being in active connection with the actuator is thus also moved. It is essential here that the movement initiated by the actuator be carried out such that the braking element is moved in a direction that is opposite the direction of the braking force in the activated state of the brake unit. In this connection, it is, in principle, conceivable that the electromagnetic actuator is connected directly to the braking element. As an alternative, the actuator is connected to the braking element via a gear and/or via a lever.

According to another very special embodiment of the present invention, the actuator is connected to the braking element via a lever, wherein the lever has a lever element, a pivot bearing and a bolt. The use of the above-described structural components makes it possible to generate a sufficient braking force as well as triggering force for activation or deactivation, respectively, of the braking element by selecting a suitable lever arm and by utilizing the lever principles, in spite of initiation of a comparatively weak force by the actuator. Further, the above-described structural components make possible an especially space-saving arrangement of a device, with which the brake unit can be transferred into a deactivated state.

According to another embodiment, the actuator is configured as a mechanically activatable actuator. In this case, it is conceivable that the operating staff activates the actuator by actuating an operating unit, which is in active connection with the actuator, so that the braking element is then triggered and the brake is deactivated. A movable linkage or movable lever mechanism is preferably located between the operating unit and the braking element, so that it is possible for an operator to trigger the braking element in a simple manner, for example, by pulling a handle representing the operating element in this case, to transfer the trolley with the support components and/or medical devices fastened to it into the desired position and to transfer the brake unit again into an active state here by releasing the handle. In this case as well, at least one lever is preferably provided between the operating element and the braking element, so that the braking element can be triggered by applying a comparatively weak gripping force onto the operating element. As an alternative or in addition, a gear is provided between the operating element and the braking element, so that the deactivation or triggering of the brake can again be facilitated.

The technical solution according to the present invention is characterized most particularly by its compactness. In spite of the often crowded conditions in the area between the trolley and the rail track, the necessary braking force or the opposing force necessary for triggering the brake can be achieved by providing a lever arrangement between the respective actuator and the braking element. According to a special embodiment, the braking element has at least one brake lining and a brake lining holder. The brake lining holder and the brake lining are preferably configured such that the brake lining can be replaced in a comparatively simple manner as needed.

The special advantage of the present invention is that because of using a spring force or a magnetic force for activating the brake, no auxiliary energy in the form of electric energy or compressed air is needed. Even in case of a power failure, in which a compressed air unit would also fail, the trolley with the support components and/or medical devices located on it is located in a secure operating state. A constant braking torque is especially generated, which, for example, is entirely independent of any fluctuations of the pressure in the compressed air unit. Electric or mechanical energy is only needed for the deactivation of the brake, i.e., for the short time, in which the trolley shall be moved along the rail track. In addition, the present invention makes possible an especially compact construction of the brake unit and thus an economical and efficient operation of a beam-mounted supply unit in a hospital.

The present invention will be explained in more detail below with reference to the figures based on special exemplary embodiments without limiting the general inventive idea. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
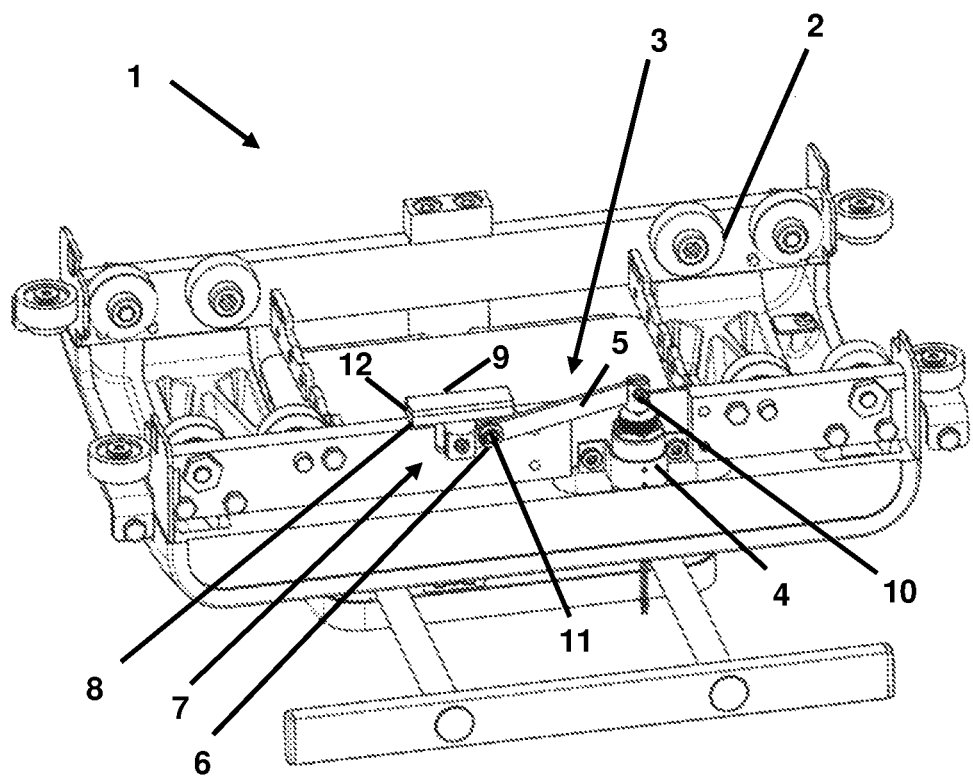
FIG. 1 is a perspective view showing a trolley/shuttle, which can be moved along a rail track of a beam-mounted supply device.

Referring to the drawings, FIG. 1 shows a trolley 1, which is also called a shuttle, for a beam-mounted supply unit 20, via which device carriers and/or medical devices can be fastened to a ceiling of a treatment room or operating room. The trolley 1 has a chassis 2 with rollers, which are movable along a rail track 13 of the beam-mounted supply unit 20. Such a trolley 1, which can be moved both along a straight line and around correspondingly provided curve elements on the ceiling of a treatment room or operating room, is used at the same time for connecting the supply of gas, power, compressed air and/or data provided in the hospital to the medical devices fastened to the trolley 1. The trolley 1 passes on corresponding media, electric energy and/or data from the hospital infrastructure into corresponding feed lines and couplings, to which the medical devices that are correspondingly needed can then be connected.

The trolley 1 shown in FIG. 1 has, furthermore, a brake unit 3 configured according to the present invention, which essentially has an electrically driven actuator 4, a lever 5, a pivot bearing 6 as well as a braking element 7, which is configured as a brake plunger 8. In the currentless state, i.e., when the actuator 4 is not supplied with electric energy, the braking element 7, here the brake plunger 8 with its brake lining 9, is located in the braked position and presses, with spring force applied, against a corresponding opposing element on the rail track 13. The spring, which exerts the needed force in the braked state of the trolley 1, is an integral component of the actuator 4. The transmission of force is carried out via the lever 5, which is pivoted about the pivot bearing 6.

If the trolley 1 shall be moved, then the operator actuates a switching element, as a result of which the actuator is supplied with electric energy while the operating element is pressed. As a result of this, the adjusting element 10 of the actuator 4, which is configured as an adjusting bolt, is moved against the spring force out of the actuator 4 and the lever 5 is pivoted upwards about the pivot bearing 6. As a result of this, the brake plunger 8 is removed from the corresponding opposing element, the brake is thus triggered, and the trolley is located in an unbraked state, in which this trolley with the medical devices fastened to it can be moved along the rail track.

As soon as the operator no longer holds the operating element pressed, the actuator 4 is transferred again into a currentless state, in which this actuator is not supplied with electric energy, so that the adjusting element 10, which is configured as an adjusting bolt, is again moved into the starting position by means of a spring provided in the actuator 4. As the same time, the lever 5 is pivoted about the pivot bearing 6 in the direction towards the actuator 4 and the braking element 7, here in the form of the brake plunger 8, is pressed again against the opposing element provided at the rail track. The brake is now again activated and the trolley with the medical devices fastened to it is again located in a braked state.

Figure 2:
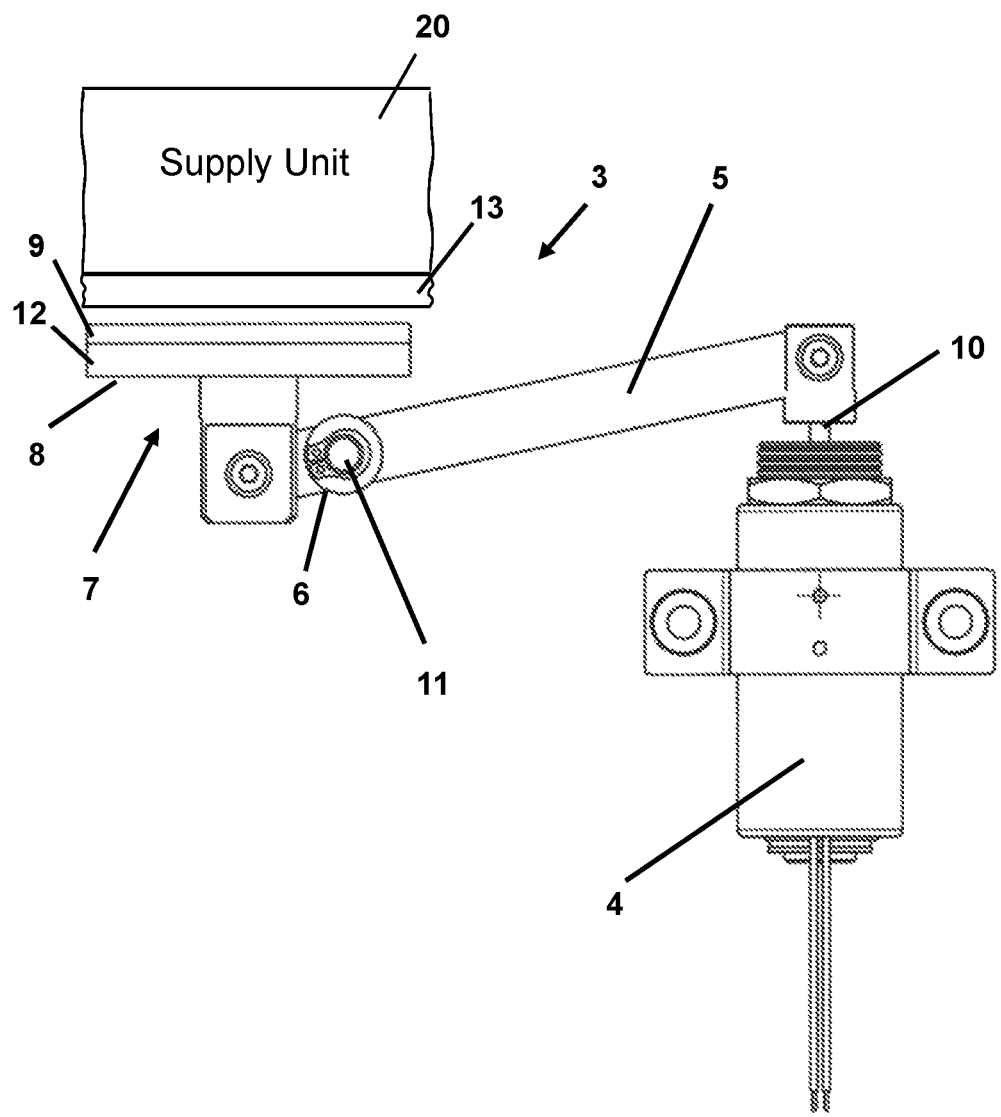
FIG. 2 is a side view showing a brake unit for stopping the trolley of a beam-mounted supply device.

In addition, FIG. 2 shows the brake unit 3 of a trolley 1, which can be moved along the rail track of a beam-mounted supply unit when the brake has been deactivated or triggered. The brake unit 3 is only deactivated at times based on need in order to be able to move the trolley 1 or the shuttle along the rail track to the desired location. The trolley 1 has a chassis 2, as it is shown in FIG. 1, wherein the chassis 2 has wheels, which can roll along the rail track, so that the trolley 1 with the medical devices fastened to it or with correspondingly provided device carriers for accommodating medical devices can be moved to the desired position. The rail tracks being used are in this case fastened to the ceiling and bear the weight of the trolley 1 with the devices fastened to it.

According to the present invention, the brake unit 3 is configured such that the braking element 7 with the brake plunger 8 shown in FIG. 2 is located in a braked state, as soon as the actuator 4 is not supplied with an auxiliary energy, especially not supplied with electric energy. In the exemplary embodiment described here, the brake plunger 8 in the braked state, i.e., with the brake activated, is moved, with spring force applied, against the rail track 13 via the lever 5, so that the trolley 1 connected to the brake element 7 (not shown in FIG. 2) cannot be moved. This operating state is reached as soon as the trolley 1 with the devices fastened to it is located at the desired position and shall remain in this desired position. Provided it is necessary to transfer the trolley 1 with the devices fastened to it into a different position, electric energy is applied to the actuator 4 of the brake unit 3, wherein the adjusting element 10, which is configured as an adjusting bolt, is moved out of the actuator 4. Because of this movement, the lever 5, as shown in FIG. 2, is moved upwards about the pivot bearing 6 and, as a result, the brake plunger 8 is raised from the brake seat provided for this in the area of the rail track 13.

The trolley 1 is thus transferred into an unbraked or not stopped state, so that this trolley together with the devices fastened to it can be moved along the rail track. Because of the combination of an electrically driven actuator, in which the adjusting element 10 in the form of an adjusting bolt, which is moved against a spring force in case of activation by means of electric energy, with a lever 5 and a suitably configured brake unit 3, which combination is shown in FIG. 2, an especially compact, space-saving configuration is provided for the brake of a trolley 1 for a ceiling-mounted supply unit. Because of the provision of a lever 5 between the adjusting element 10 of the actuator 4 and the braking element 7, here in the form of a brake plunger 8 with a brake lining 9, both a strong braking force and triggering force can be reached at the brake plunger 8 by applying a comparatively weak force to the adjusting element. The brake lining 9 is moved by the plunger 8 into braking engagement with a portion of the rail track 13 (FIG. 2). In reference to the triggering force to be achieved, this may especially be advantageous when the spring element, which acts on the braking element 7 in the braked state of the trolley 1, is not directly integrated into the actuator 4, but rather is arranged, for example, as a coil spring in the pivot bearing 6.

The brake unit 3 shown in FIG. 2 thus has, as essential components, a brake plunger 8, an actuating lever 5, a pivot bearing 6, a bolt 11 for mounting the pivot bearing 6, as well as the corresponding actuator 4. The braking element 7 of the brake unit 3, which is in the form of a brake plunger 8 here, has a brake lining holder 12 as well as a brake lining 9. Replacement of the brake lining 9 is thus possible almost without any problems.

The braking force in the braked state of the trolley 1 is usually generated by a spring, which is an integral component of the actuator. In this case, both the braking force and the triggering force are transmitted to the braking element 7 via the lever 5 shown in FIGS. 1 and 2, so that, on the one hand, a compact configuration of the brake device 3 can be achieved and, on the other hand, a comparatively weak force is necessary for activating or deactivating the brake because of the lever arm.

By means of the device for braking a trolley 1 for a beam-mounted supply unit being described, a compact, space-saving braking device is thus made available, which likewise ensures that the trolley 1 and thus also the medical devices fastened to it are located in a stopped state in case of a power failure. A triggering or deactivation of the brake is possible for the operator in a comparatively simple manner, and it is ensured that the brake is only triggered as long as the operator would like.

While specific embodiments of the invention have been shown and described in detail to illustrate the application of the principles of the invention, it will be understood that the invention may be embodied otherwise without departing from such principles.

The invention claimed is:

1. A beam-mounted supply unit for fastening medical devices and device carriers, which are suitable for accommodating medical devices, to a ceiling of a care room, treatment room or operating room, the supply unit comprising:
   a supply unit for the transmission of medical gases, compressed air, operating materials, electric energy and/or data from a hospital infrastructure in at least one medical device;
   at least one rail track fastened directly or indirectly to the ceiling; and
   a trolley that can be stopped in relation to the rail track and can be moved along the rail track during a deactivation of a brake unit based on need, wherein the trolley comprises:
   a chassis, which can be meshed with the rail track of the beam-mounted supply unit for moving the trolley and which can be moved along the rail track and to which at least one medical device can be directly or indirectly fastened;
   a brake unit comprising at least one braking element, which exerts a braking force on the rail track or on the chassis or on the rail track and on the chassis in an activated state of the brake unit, so that a movement of the chassis along the rail track unit is at least made difficult compared to an operating state with a deactivated brake, and an electromagnetically or mechanically or an electromagnetically and mechanically driven actuator, wherein in the activated state of the brake unit, the braking force exerted by the braking element on the rail track or on the chassis or on the rail track and on the chassis is generated without an aid of electric energy, and the brake unit is deactivated and the braking element is triggered by an opposing force acting against the braking force exerted on the rail track or on the chassis or on the rail track and on the chassis being generated by means of the actuator.

2. A beam-mounted supply unit in accordance with claim 1, wherein in the activated state of the brake unit, the braking force exerted by the braking element on the rail track or on the chassis or on the rail track and on the chassis is generated by means of an element, which exerts a spring force and/or magnetic force.

3. A beam-mounted supply unit in accordance with claim 1, wherein the brake unit further comprises at least one lever element, wherein the actuator acts on the braking element the via at least one lever element.

4. A beam-mounted supply unit in accordance with claim 1, wherein the actuator comprises an electric motor or a pulling magnet or pushing magnet that can be electrically actuated.

5. A beam-mounted supply unit in accordance with claim 1, further comprising an operating element, wherein the actuator can be moved by actuating the operating element.

6. A beam-mounted supply unit in accordance with claim 1, wherein the braking element further comprises a brake plunger, which is pressed at least partly against the rail track or the chassis or against the rail and the chassis in the activated state of the brake unit.

7. A beam-mounted supply unit in accordance with claim 6, wherein the brake plunger has at least one brake lining and a brake lining holder.

8. A beam-mounted supply unit in accordance with claim 1, wherein the brake unit further comprises a lever element, a pivot bearing and a bolt, which are in active connection with the actuator.

\* \* \* \* \*